Jan. 15, 1963
M. M. SHERIFF ET AL
3,073,344
TRANSDUCER VALVE
Filed Aug. 22, 1958
6 Sheets-Sheet 1
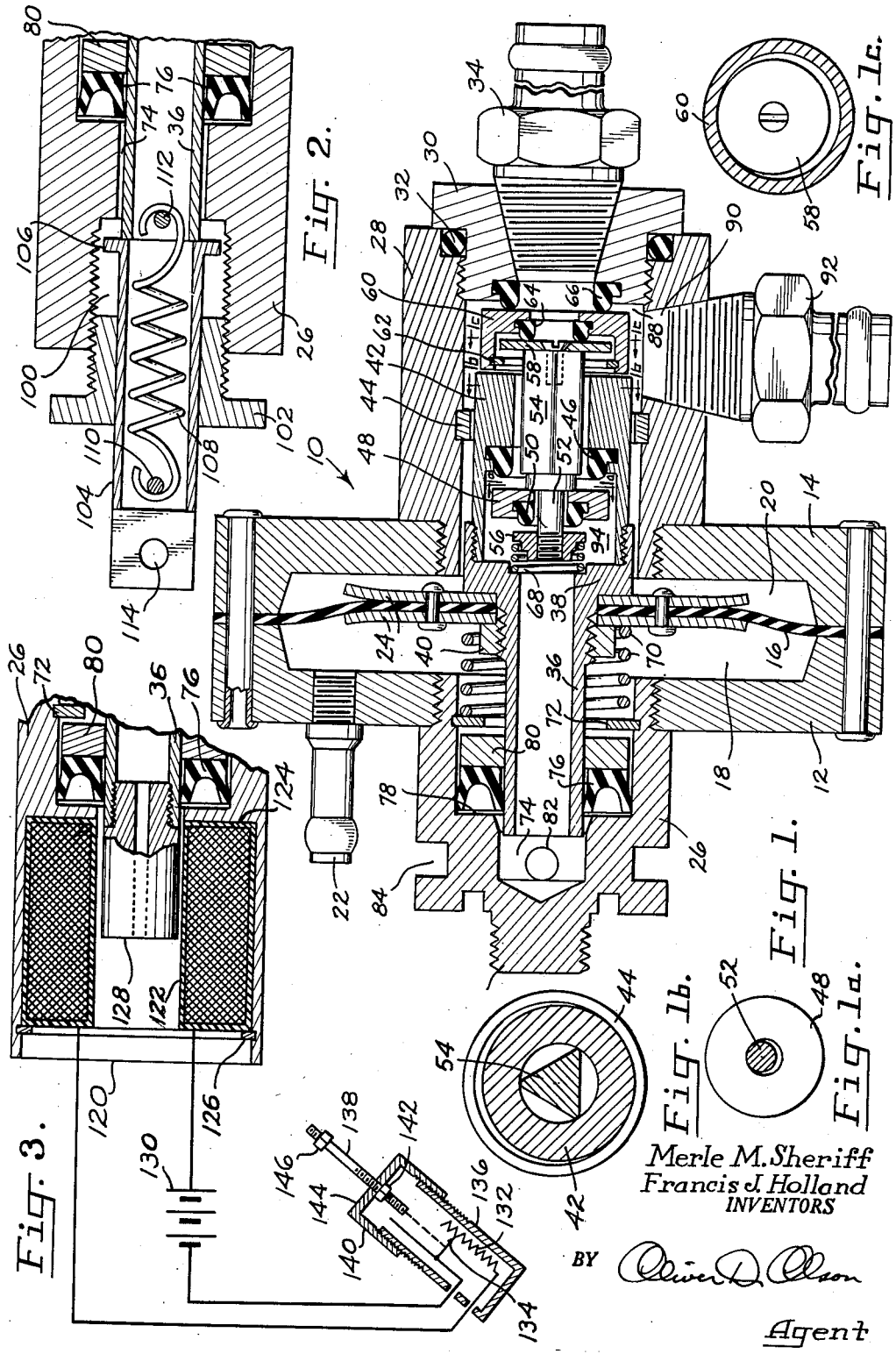
Merle M. Sheriff
Francis J. Holland
INVENTORS
BY *Oliver D. Olson*
*Agent*

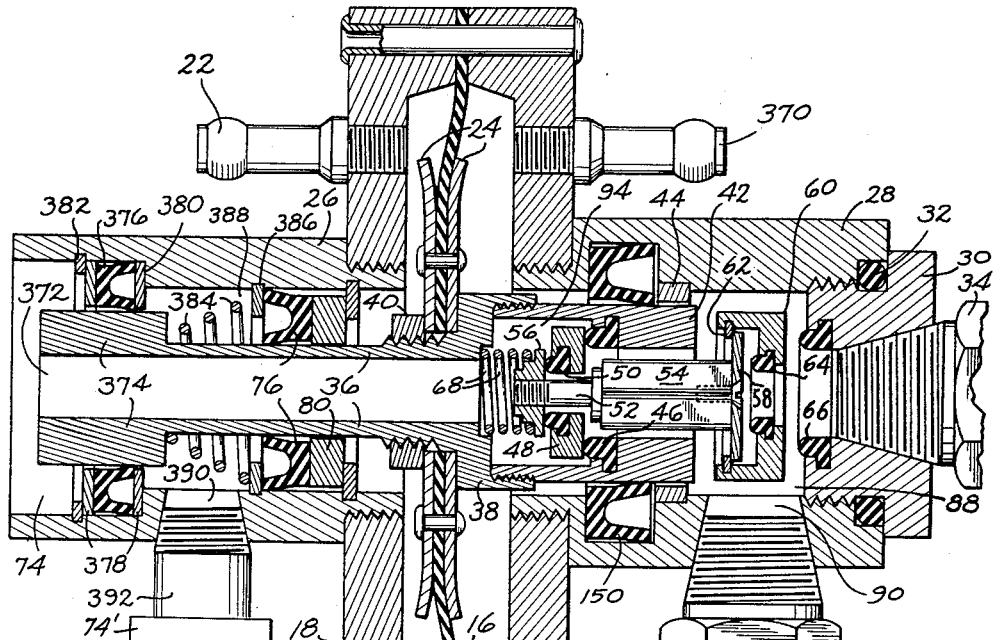
_Fig. 13._
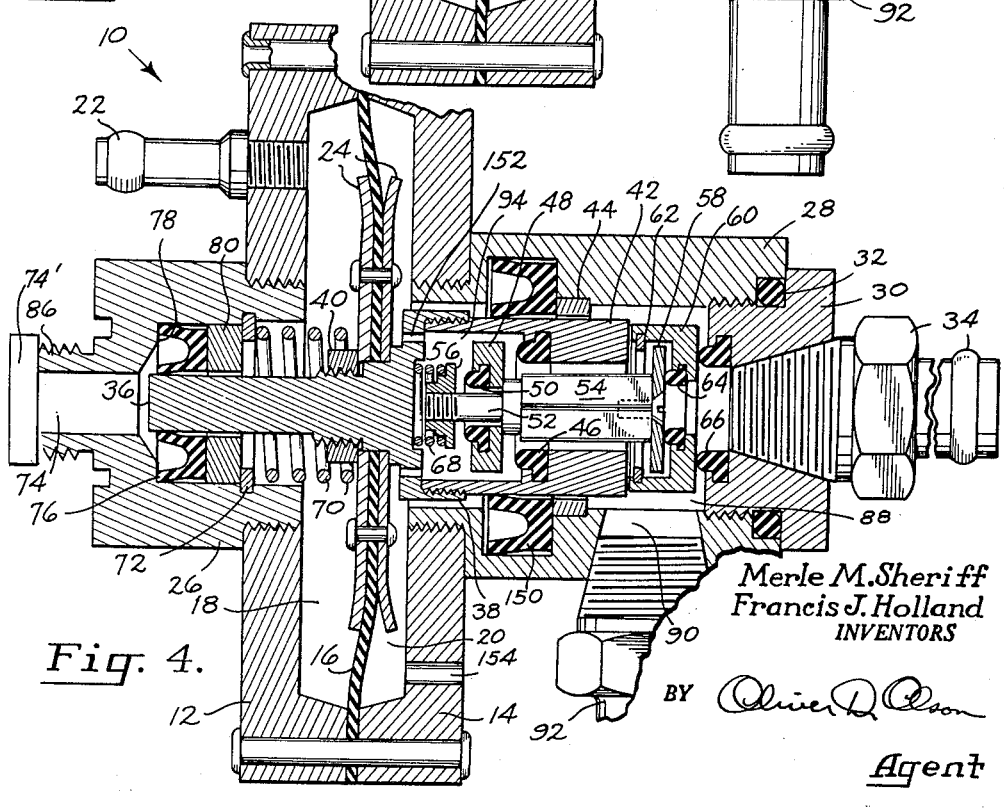
_Fig. 4._
Merle M. Sheriff
Francis J. Holland
INVENTORS
BY Oliver D. Olson
Agent Merle M. Sheriff
Francis J. Holland
INVENTORS

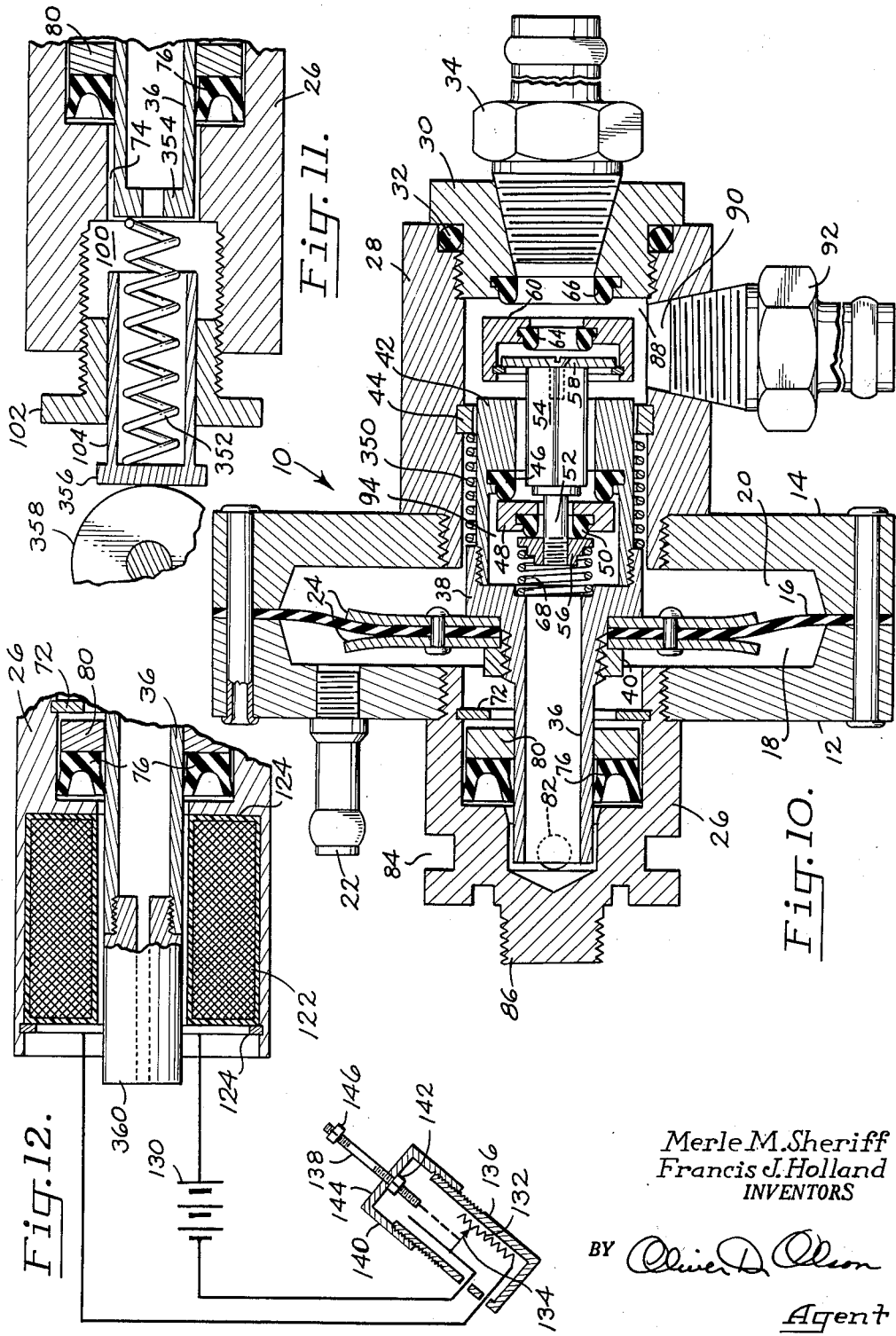

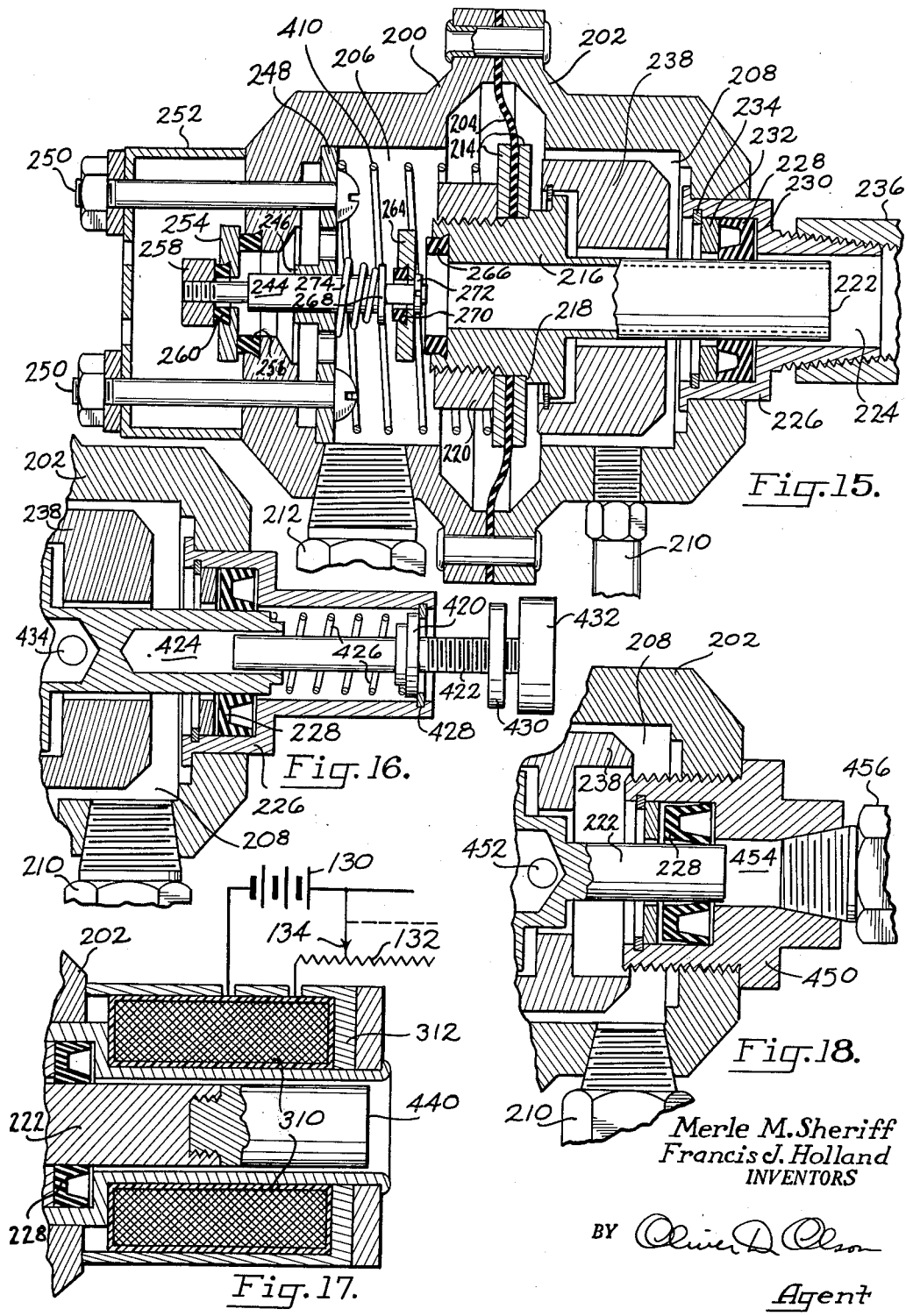

United States Patent Office 3,073,344
Patented Jan. 15, 1963

3,073,344
TRANSDUCER VALVE
Merle M. Sheriff, Minoa, and Francis J. Holland, Syracuse, N.Y.; said Sheriff assignor to said Holland
Filed Aug. 22, 1958, Ser. No. 756,665
23 Claims. (Cl. 137—623)

This invention pertains to valves of the type which provide an output signal in response to an input signal of the same or different type, and relates particularly to transducer valves which provide a large volume fluid pressure output in response to a small capacity input signal in the form of a vacuum signal, a pneumatic signal, a hydraulic signal, a mechanical signal such as a spring, or an electrical signal.

There are many instances in which it is desirable to control the operation of a fluid pressure power device precisely and instantly from a remote position. Illustrative of such applications is the control of fluid pressure to the wheel cylinders or other brake operating means of a vehicle braking system, from the remote position of the driver's seat. In such operation, it is necessary that the wheel brake operating means respond instantly and precisely to the minutest movement of the brake pedal, and that there be provided the degree of braking effort desired by the driver in response to the movement of his foot on the brake pedal.

It is a principal object of the present invention to provide a transducer valve which provides a precisely controlled high volume fluid pressure response to any one of a number of variable signals impressed upon the transducer valve by various forms of control systems.

Another important object of this invention is the provision of a transducer valve which provides a high volume fluid pressure response instantly and in precise proportion to a small variable input signal which may be controlled from a remote position.

A further important object of this invention is the provision of a transducer valve the components of which may be assembled in various ways to accommodate control by various forms of input signals.

Still another important object of the present invention is to provide a transducer valve which is of simplified construction for economical manufacture, which is assembled and disassembled with maximum speed and facility, and which provides precise operation over extended periods of use with a minimum of maintenance and repair.

The foregoing and other objects and advantages of this invention will appear from the following detailed description, wherein reference is made to the accompanying drawings in which:

FIG. 1 is a view in longitudinal horizontal section of a vacuum signal controlled transducer valve embodying features of this invention;

FIGS. 1a, 1b and 1c are sectional views taken along the respective lines 1a—1a, 1b—1b and 1c—1c in FIG. 1;

FIG. 2 is a fragmentary view in longitudinal horizontal section showing a modification of a portion of the transducer valve of FIG. 1 to adapt the latter for control by a spring signal;

FIG. 3 is a fragmentary view in longitudinal horizontal section showing a further modification of a portion of the transducer valve of FIG. 1 to adapt a latter for control by an electric signal;

FIG. 4 is a view in longitudinal horizontal section showing a vacuum-hydraulic signal controlled transducer valve embodying features of this invention;

FIG. 10 is a view in longitudinal horizontal section showing a vacuum signal controlled transducer valve similar to FIG. 1 but arranged for operation on the vacuum suspended principle;

FIGS. 11 and 12 are fragmentary views in longitudinal horizontal section showing modifications of a portion of the transducer valve of FIG. 10 to adapt the latter for control by spring and electric signals, respectively;

FIG. 13 is a view in longitudinal horizontal section showing a vacuum hydraulic signal controlled transducer valve similar to FIG. 4 but arranged for operation on the vacuum suspended principle;

FIG. 14 is a view in longitudinal horizontal section showing a hydraulic multiplier form of hydraulic signal controlled transducer valve similar to FIG. 5 but arranged for operation on the vacuum suspended principle;

Figure 6:
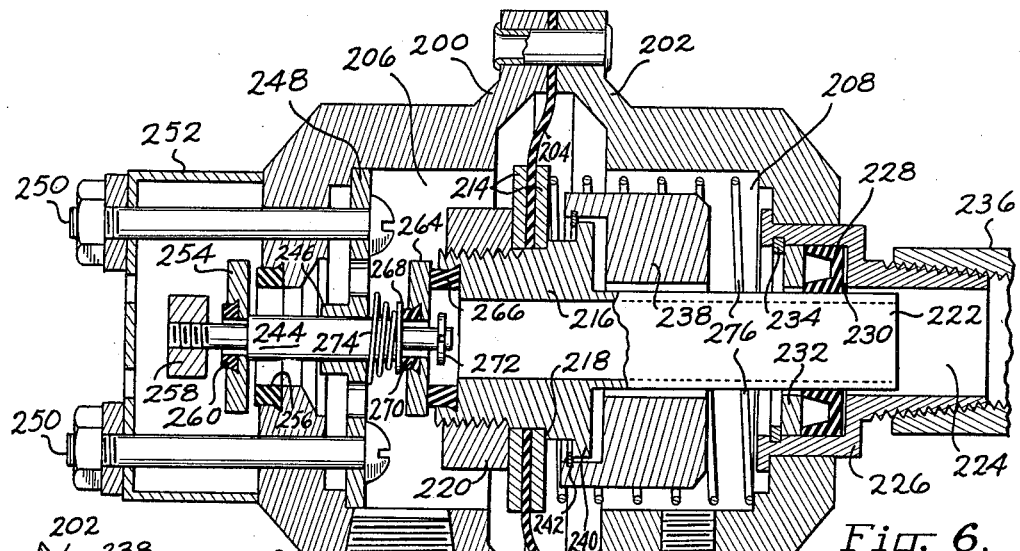
FIG. 6 is a view in longitudinal horizontal section showing a modified form of vacuum signal controlled transducer valve embodying features of the present invention.

FIG. 15 is a view in longitudinal horizontal section showing a vacuum signal controlled transducer valve similar to FIG. 6 but arranged for operation on the vacuum suspended principle; and FIGS. 16, 17 and 18 are fragmentary views in longitudinal horizontal section showing modifications of a portion of the transducer valve of FIG. 15 to adapt the latter for control by spring, electric and hydraulic signals, respectively.

In general, each of the various forms of transducer valves functions to produce a certain differential fluid pressure as a function of, and in proportion to, some form of input signal. Although the differential pressure provided may be in the form of a positive air pressure, for example a differential pressure between atmospheric pressure as a reference and an air pressure above atmospheric, the embodiments of the invention illustrated in the drawings are described hereinafter as functioning to provide a vacuum differential pressure output.

The transducer valves illustrated in FIGS. 1–9 operate on the air suspended principle, wherein each valve assembly is at atmospheric pressure when in normal rest condition, and the output vacuum is provided by the controlled evacuation of one side of the valve. In the vacuum suspended transducer valves illustrated in FIGS. 10–18, each valve assembly is at inlet vacuum pressure when in normal rest condition, and the output vacuum is derived by the controlled introduction of atmospheric air to one side of the valve.

TRANSDUCER VALVES

Air Suspended Principle

Referring to FIG. 1 of the drawings, the valve illustrated includes an intermediate hollow diaphragm section 10 formed of substantially identical hollow shells 12 and 14 secured together adjacent their peripheries by such means as the rivets illustrated. Secured between the shells is a resilient diaphragm 16 which functions to divide the diaphragm sections into a reference fluid pressure chamber 18 and a controlled variable fluid pressure chamber 20. A lateral tapped opening in the housing shell 12 receives the hollow hose fitting 22 which functions to communicate the chamber 18 with a source of variable fluid pressure, which functions as a signal pressure as explained more fully hereinafter.

The diaphragm 16 is constructed of rubber or other suitable material, preferably neoprene rubber, and is apertured centrally and reinforced on its opposite sides by the backing plates 24 which are secured together by such means as the rivets illustrated.

The housing shells are apertured centrally and tapped for connection of the hollow end sections 26 and 28. The exposed end of the section 28 is threaded internally to receive the end closure 30, an air tight seal being formed therebetween by the sealing ring 32. The closure is provided with a central tapped bore for connection of the hose coupling 34, for connection to a source of vacuum.

A stem 36 extends through the central opening provided in the assembly of the diaphragm and backing plates, and is secured to the latter by abutment of the enlarged stem head 38 and the securing nut 40. An annular threaded shoulder on the head functions to connect the head extension 42. The head extension is guided for reciprocation by a bushing 44 mounted in an annular groove in the end section 28. As shown somewhat exaggerated in FIG. 1b, clearance between the extension and bushing affords air passage to opposite ends of the bushing, for purposes explained more fully hereinafter.

The head extension 42 is provided intermediate its ends with an internal annular check seal 46. Positioned within the head extension between the seal 46 and the stem head 38 is a secondary valve seat 48. This seat is provided with a central opening defined in part by the annular check seal 50 which projects from the side of the valve seat 48 opposite the side which faces the seal 46. The reduced end 52 of a valve stem 54 projects freely (FIG. 1a) through an opening in the valve seat 48 for supporting the latter, and is threaded at its outer end to receive the pilot valve seat 56. Sufficient space is provided between the pilot valve seat and the shoulder on the valve stem to permit limited longitudinal movement of the secondary valve seat 48 therebetween.

The enlarged section of the valve stem 54 extends freely through the central opening in the head extension 42 for sliding support by the latter, and is of triangular or other noncircular cross section (FIG. 1b) to provide a space between the stem and opening. The terminal end of the valve stem supports a pilot valve seat 58, secured thereto as by means of the screw illustrated. A secondary valve seat 60 (FIG. 1c) freely encircles and is supported by the pilot valve seat for relative longitudinal movement between the snap ring 62 and the check seal 64 surrounding the central opening in the secondary valve seat. The secondary valve seat is arranged for releasable abutment against the annular check seal 66 surrounding the opening in the end closure 30. The facing ends of the secondary valve seat 60 and the head extension 42 are sufficiently rough to afford passage of air between them even when they are in abutment, for purposes explained more fully hereinafter.

Thus, the head extension 42 is supported by the stem head 38 and guided for reciprocation by the bushing 44; the stem 54 is supported slidably by the extension 42; the valve seat 48 is supported slidably by the stem end 52; and the secondary valve seat 60 is supported slidably by the pilot valve seat 58. It will be understood that these elements will be in physical contact with each other, although they are shown in FIG. 1 separated by spaces for clearer understanding of the invention.

A spring 68 is interposed between the stem head 38 and the pilot valve seat 56 to resiliently urge the valve stem 54 toward the right, to close the valve seats 58 and 60 against their respective check seals. A second spring 70 is interposed between the side of the diaphragm opposite the stem head 38 and a snap ring 72 supported in an annular groove in the end section 26. This spring functions to urge the stem and head extension resiliently toward the right to maintain the valve seats 48 and 56 separated from their respective seals, in the normal rest condition of the valve assembly.

The stem 36 projects freely into a longitudinal end bore 74 provided in the end section 26. This bore is sealed from the diaphragm chamber 18 by means of the cup seal 76 which encircles the stem and is confined in the end section between the shoulder 78 and guide collar 80, the latter being backed by the snap ring 72. The outer end of the bore 74 terminates within the end section 26 and communicates with the atmosphere by means of the connecting bore 82 which communicates at its outer end with an annular groove 84 formed in the end section. The terminal end 86 of the end section 26 is reduced in diameter and threaded externally for convenient mounting of the transducer valve in a tapped opening of a supporting member, as explained more fully hereinafter.

By the foregoing arrangement there is provided a controlled vacuum chamber 88 formed between the sealing ring 32 and the diaphragm 16. Communication between the controlled vacuum chambers 88 and 20 is afforded by the space between the bushing 44 and the extension 42 which is slidable therein. A tapped opening 90 is provided in the end section 28 for communication with the controlled vacuum chamber, and this opening receives the hose coupling 92 for connection to a device to be operated by the controlled vacuum. An air chamber 94 is formed by the hollow stem 36 and head extension 42, between the valve seat 46 and the opening 82 which communicates with the atmosphere. The controlled vacuum chamber communicates with the air chamber, upon unsealing of the seats 48, 56, through the hollow head extension 42 and the space between the abutting ends of the extension 42 and seat 60. The controlled vacuum chamber communicates with the vacuum source coupling 34, upon unsealing of the seats 58, 60, through the space between the abutting ends of the extension 42 and seat 60. The vacuum signal chamber 18 is formed between the cup seal 76 and the diaphragm 16, and is adapted for connection to a controlled vacuum signal source connected to the hose coupling 22.

Referring now to FIG. 2 of the drawings, there is shown a modification of the left end of the transducer valve of FIG. 1, to adapt the valve for control by a spring signal. In the embodiment illustrated, the outer end of the section 26 is provided with a tapped bore 100, forming an extension of the bore 74. A hollow adjustment nut 102 engages this threaded bore and slidably receives the hollow sleeve 104 therein. The sleeve is provided at its inner end with an annular projecting flange 106 adapted to abut against the inner end of the adjustment nut at the limit of outward extension of the sleeve. An elongated helical spring 108 is secured at one end within the sleeve, as by means of a transverse pin 110, and at the opposite end to the stem 36, as by means of the transverse pin 112. The outer end of the sleeve is provided with a connection, such as the opening 114, for pivotal attachment of an actuating mechanism, such as a mechanical linkage system connected to a brake pedal on a vehicle.

Referring now to FIG. 3, the outer end of the section 26 of FIG. 1 is modified to provide an enlarged bore 120, communicating with the bore 74, and designed to receive therein the hollow solenoid coil 122, the latter being confined therein between the shoulder 124 and snap ring 126. The hollow stem 36 projects into the hollow coil, and is provided with a hollow section of soft iron 128 which functions as the armature of the coil. The soft iron section is arranged in relation to the coil in such manner that energization of the latter induces longitudinal movement of the stem toward the left, i.e. in the same direction which is induced by the vacuum signal and the spring signal in the constructions shown in FIGS. 1 and 2, respectively.

The electric circuit of the solenoid includes the series arrangement of a source of electric potential, such as the battery 130, the variable resistance element 132 and the movable contact 134 associated therewith. In the embodiment illustrated, the resistance element is housed in an elongated tube 136. The contact 134 is carried by a plunger 138 which is adapted for operation by any desirable means, for example a brake pedal on a vehicle.

The limit of longitudinal force on the stem 36 and its attached assembly may be controlled over a variable range by limiting the movement of the contact 134 along the resistance element 132. This is accomplished in the embodiment illustrated by providing an internally threaded sleeve 140 over the tube 136, and an enlarged shoulder 142 on the plunger 138, between the tube and the closed outer end 144 of the sleeve. Thus, the limit of outward movement of the plunger is established by abutment of the shoulder against the closed end of the sleeve, this limit of extension being controlled by longitudinal adjustment of the sleeve with respect to the tube.

Alternatively, if it is desired to limit the extent of movement of the plunger into the tube, the plunger may be threaded externally for reception of the adjustment nut 146, arranged for abutment against the outer end of the sleeve. In this case, it will be understood that it may be desirable to modify the electrical connection to the resistance element 132.

Referring now to FIG. 4 of the drawings, the vacuum hydraulic signal controlled transducer valve shown therein is similar in construction to the valve shown in FIG. 1, with the following exceptions: A cup seal 150 is interposed between the stem head extension 42 and the valve section 28, adjacent the guide bushing 44. One or more openings 152 are provided in the stem head 38 to interconnect the air chamber 94 and the diaphragm chamber 20, the latter being open to the atmosphere through one or more openings 154 provided in the diaphragm shell section 14.

The hollow stem 36 of FIG. 1 is replaced, in the construction of FIG. 4, with a solid stem, the other end of which communicates with the bore 74 which extends through the externally threaded connecting end 86 of the section 26.

By the foregoing construction, the controlled vacuum chamber 88 is provided between the sealing ring 32 and the cup seal 150. The air chamber 94, 20 is defined by the check seal 46 and the diaphragm 16 and is exposed to the atmosphere through openings 152 and 154. The vacuum signal chamber 18 is the same as previously described, and the bore 74 serves as a hydraulic fluid pressure chamber.

Figure 5:
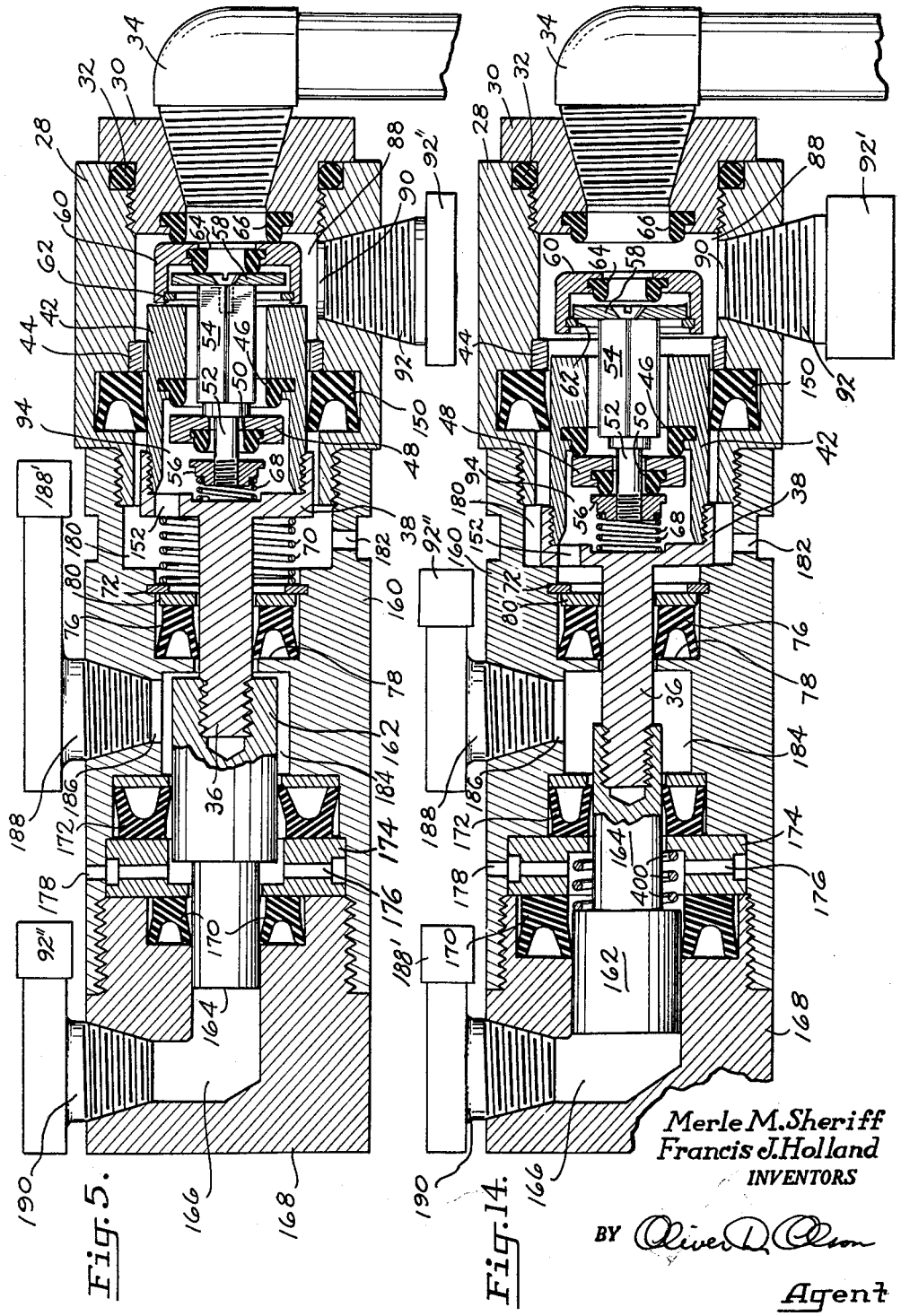
FIG. 5 is a view in longitudinal horizontal section showing a hydraulic multiplier form of hydraulic signal controlled transducer valve embodying features of this invention.

Referring now to FIG. 5 of the drawings, there is shown a transducer valve of the hydraulic multiplier type. This valve and the valve shown in FIG. 4 are similar in the structural arrangement of the stem assembly and associated valves carried in the end section 28. However, the diaphragm section 10 of FIG. 4 is replaced in the valve assembly of FIG. 5 by an intermediate hollow housing section 160 which receives the stem 36 and the associated cup seal 76 and compression spring 70.

Secured to the terminal end of th stem 36 is the enlarged section 162 of a stepped piston. The smaller section 164 of the stepped piston projects into the smaller bore 166 provided in the end section 168. Oppositely directed cup seals 170 and 172 are mounted in annular grooves in the end section 168 and intermediate section 160, respectively, to provide hydraulic seals about the smaller and larger sections of the stepped piston. A spacer 174 is interposed between the cup seals and this spacer is provided with one or more radial openings 176 registering with openings 178 in the intermediate section, for venting the space between the cup seals to the atmosphere.

By the foregoing construction, there is provided the controlled vacuum chamber 88 formed between the sealing ring 32 and the cup seal 150, as in the arrangement of FIG. 4. An air chamber 94 is formed between a check seal 46 and the cup seal 76, the chamber 94 communicating with the chamber 180 through the openings 152 in the stem head 38. The chamber 180 is vented to the atmosphere through one or more openings 182 in the intermediate section 160. The low pressure hydraulic fluid chamber 184, defined between the cup seal 76 and 172, communicates with a tapped opening 186 in the intermediate section, the opening receiving a conduit coupling 188. The high pressure hydraulic fluid chamber 166 also communicates with a tapped opening in the end section 168, the opening receiving the conduit coupling 190.

Referring now to FIG. 6 of the drawings, there is shown a modified form of vacuum signal controlled transducer valve which provides the same mode of operation as the transducer valve shown in FIG. 1. The valve assembly is contained substantially within a housing formed of the hollow shells 200 and and 202 secured together adjacent their peripheries by such means as the rivets illustrated. Secured between the shells is the resilient diaphragm 204 which functions to provide the diaphragm section to a controlled variable fluid pressure chamber 206 and a signal fluid pressure chamber 208. A tapped opening in the housing shell 202 receives the hose coupling 210 which functions to communicate the chamber 208 with a source of variable signal fluid pressure. Another tapped opening in the shell 200 receives the hose coupling 212 which communicates the chamber 206 with a vacuum powered device to be controlled.

The diaphragm is constructed of rubber or other suitable material, preferably neoprene rubber, and is apertured centrally and reinforced on its opposite sides by the backing plates 214. A hollow stem head 216 extends through the central opening provided in the assembly of the diaphragm and backing plates, with the latter secured firmly between an annular shoulder 218 on the head and the securing nut 220 threaded or otherwise secured to the head.

The hollow stem 222 extends from the head 216 through a central axial opening 224 in the end closure 226, the latter being secured in an axial opening in the shell 202. The space between the stem and end closure opening is sealed by the cup seal 228 which is retained in the end closure between the shoulder 230 and the washer 232, the latter being backed by the snap ring 234 mounted in an annular groove in the end closure. The outer end of the end closure 226 is threaded for the reception of the hose coupling 236, adapted for connection to a source of vacuum.

Mounted concentrically about the stem 222 within the chamber 208, is a dampener weight 238. An annular recess in the dampener weight receives the radially projecting shoulder 240 on the stem head 216, and a snap ring 242 carried by the dampener weight functions to confine the shoulder 240 in the recess. In this manner the dampener weight is mounted upon and movable with the stem assembly.

A valve pin 244 is mounted for longitudinal movement in the hollow hub 246 of a perforated plate 248. The plate is mounted in the diaphragm chamber 206 and is secured therein by means of the elongated bolts 250 which extend outwardly through openings in the shell 200. In the preferred embodiment illustrated, these bolts also serve to secure an air filter cap 252 to the outer end of the shell 200.

The valve pin 244 extends through an axial opening in the shell 200 and is reduced in diameter at its outer end to receive the secondary air valve seat 254 freely thereon. This secondary air valve seat is arranged for releasable sealing engagement with an annular check seal 256 mounted in the shell 200 and surrounding the axial opening therein. The outer end of the valve pin is threaded for reception of the pilot air valve seat 258 which is arranged for releasable sealing engagement with the annular check seal 260 mounted on the secondary air valve seat 254 about the central opening therein.

Thus, the secondary air valve seat 254 is confined on the valve pin 244 between the pilot air valve seat 258 and the shoulder defiing the reduced end of the pin. Sufficient space is provided between the shoulder and pilot valve seat to permit limited longitudinal movement of the secondary air valve seat therebetween.

The inner end of the valve pin 244 also is reduced in diameter and supports a secondary vacuum valve seat 264 freely thereon for releasable engagement with the annular check seal 266 mounted in the stem head and surrounding the central opening in the latter. A pilot vacuum valve seat 268 is provided on the valve pin, on the form of an annular shoulder, and this seat is arranged for releasable engagement with the annular check seal 270 mounted on the secondary valve seat 264 and surrounding the central openings in the latter. A snap ring 272 is mounted in an annular groove located adjacent the inner end of the valve pin, and this snap ring serves to limit the longitudinal movement of the secondary vacuum valve seat 264.

A light compression spring encircles the valve pin 244 and abuts at its opposite ends against the plate 248 and the pilot vacuum valve seat 268 respectively. This spring functions to urge the valve pin and the valve seats supported thereon, toward the right, for normally maintaining the air valve seats closed against their respective seals. A second compression spring 276 encircles the dampener weight 238 and abuts at its opposite ends against the outer end of the shell 202 and the diaphragm backing plate 214, respectively. This spring functions to urge the diaphragm and the attached stem assembly toward the left, thereby normally maintaining the vacuum valve seats closed against their respective check seals.

Figure 7:
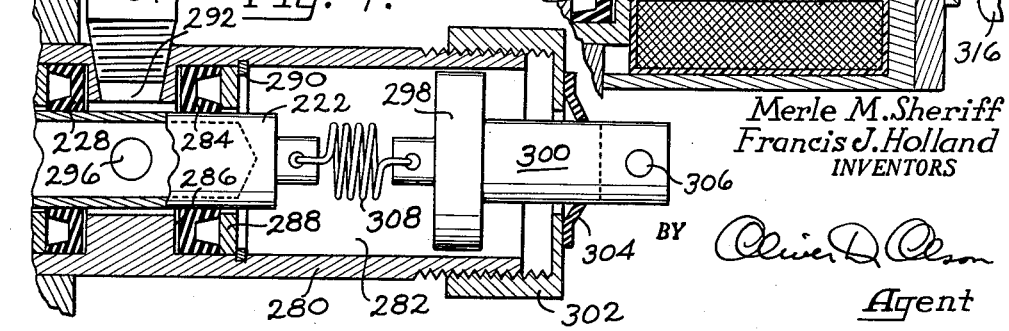

Referring now to FIG. 7 of the drawings, the spring signal controlled transducer valve is provided by modifying the valve construction shown in FIG. 6 as follows: The end closure 226 in FIG. 6 is replaced in FIG. 7 by the elongated end cylinder 280. As in FIG. 6, the stem 222 is sealed by the cup seal 228. In addition, however, the stem is extended slightly and closed at its outer end, the closed end projecting into the cylinder bore 282. A second cup seal 284 encircles the stem adjacent the outer end, and is confined between the shoulder 286 formed in the cylinder and the washer 288, the latter being backed by the snap ring 290. A tapped opening 292 is provided in the cylinder 280 between the cup seals 228 and 284, for connection of the hose coupling 294, adapted for connection to a source of vacuum. The opening 292 communicates with the interior of the hollow stem 222 by means of one or more openings 296 in the latter.

Mounted slidably within the cylinder bore 282 is the head end 298 of an actuating rod 300. The actuating rod extends outward through a central opening in an adjustment cap 302 which is mounted on the cylinder 280 for longitudinal adjustment relative thereto, as by means of the interengaging threads illustrated. A dust seal, in the form of a resilient sleeve of rubber or other suitable material, may be provided to encircle the actuating rod at the outer end of the adjustment cap, and means, such as the opening 306, may be provided in the outer end of the actuating rod for pivotal connection of operating mechanism, such as the mechanical linkage to the brake pedal of the vehicle.

A tension spring 308 interconnects the adjacent ends of the sleeve 222 and the actuating rod head 298, in manner similar to the arrangement illustrated in FIG. 2 and described hereinbefore.

Figure 8:
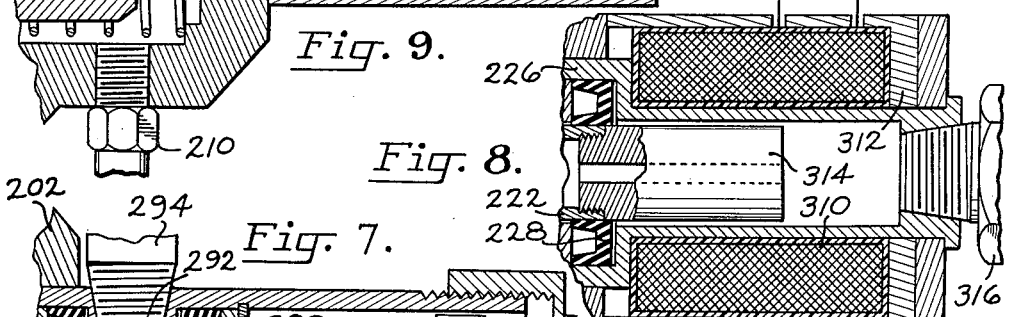

Referring now to FIG. 8, the electric signal controlled transducer valve is provided by modifying the right hand end of the structure shown in FIG. 6, as follows: The reduced section of the end closure 226 is extended outwardly to provide a support for the cylindrical solenoid coil 310 which is enclosed in a cap 312. The cap is secured in position by extending the reduced end of the end closure 226 through a central opening in the cap and then swaging over the outer end of the closure. Electrical conductors are led outward from the coil through openings in the cap for connection to an electric circuit, in the manner illustrated in FIG. 3. The outer end of the stem is provided with a soft iron section 314, so arranged with respect to the coil that energization of the latter induces movement of the stem toward the right.

The outer end of the hollow section 226 is provided with a hose coupling 316 for connection to a source of vacuum, as in FIG. 6.

Figure 9:
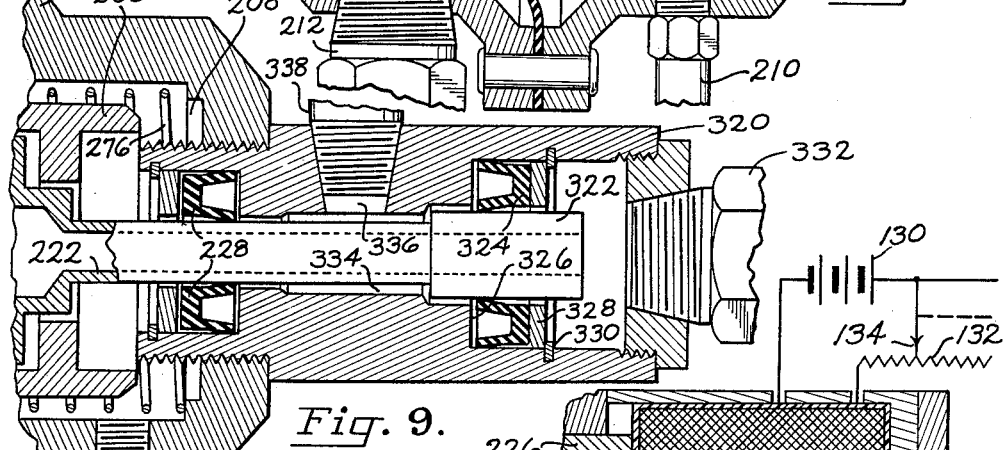
FIGS. 7, 8 and 9 are fragmentary views in longitudinal horizontal section showing modifications of a portion of a transducer valve of FIG. 6 to adapt the latter for control by spring, electric and hydraulic signals, respectively.

Referring now to FIG. 9, the hydraulic signal controlled transducer valve is provided by modifying the right hand end of the structure shown in FIG. 6 as follows: The end closure 226 in FIG. 6 is replaced in FIG. 9 with an elongated hollow end section 320, the inner end of which projects into the chamber 208 and into a recess provided in the dampener weight 238. The hollow stem 222 is sealed by the cup seal 228, as in FIG. 6, and projects toward the outer end of section 320. The outer end of the hollow stem is enlarged in diameter to provide a piston section 322. The space between the piston and the adjacent wall of the hollow section 320 is sealed by the cup seal 324 which is confined in the end section between the shoulder 326 and washer 328, the latter being backed by the snap ring 330. The outer end of the hollow section 320 is threaded internally for reception of the hose coupling assembly 332, for connection to a source of vacuum.

By the foregoing construction there is provided a hydraulic fluid pressure chamber 334 between the cup seals 228 and 324, and this chamber communicates with a tapped opening 336 in the end section 320 which receives the hydraulic fluid conduit coupling 338 for connection to a source of hydraulic fluid signal pressure, as in the structure shown in FIG. 4.

TRANSDUCER VALVE

Vacuum Suspended Principle

The vacuum signal controlled transducer valve shown in FIG. 10 is substantially identical to the valve assembly shown in FIG. 1, with the exception that the spring 70 in FIG. 1 is eliminated and a spring 350 is provided to encircle the stem head extension 42 and to abut at its opposite ends against the bushing 44 and the stem head 38, respectively. Thus, whereas in the valve assembly of FIG. 1 the valve seats 48 and 56 are spaced apart from their respective check seals and the valve seats 58 and 60 are closed against their respective seals, when the system is at rest, this arrangement of valve seats is reversed in FIG. 10, by virtue of the springs 350 normally urging the stem assembly and diaphragm toward the left.

The spring signal controlled transducer valve shown in FIG. 11 differs from the assembly shown in FIG. 2 primarily in the replacement of the tension spring 108 with the compression spring 352, which is confined within the hollow sleeve 104. The spring abuts at one end against the closed outer end of the sleeve 104, and at its inner end against a perforated plug 354 provided at the outer end of the stem 36. The sleeve 104 is provided with an annular projecting shoulder 356 at its outer end for abutment against the adjustment nut 102, to limit the extent of inward movement of the sleeve and hence to limit the degree of compression of the spring 352. Control of movement of the sleeve 104 may be provided in any manner desired, for example by the roller 358 which abuts the outer end of the sleeve and may, for example, be mounted on a mechanical linkage assembly connected to the brake pedal of a vehicle.

Referring now to FIG. 12, the solenoid operated electric signal controlled transducer valve is provided by modifying the left hand end of the section 26 in FIG. 10 in substantially the identical manner illustrated in FIG. 3. However, the soft iron section 360 carried by the stem 36 is so arranged with respect to the coil 122 that energization of the latter induces movement of the stem toward the right, as distinguished from the leftward movement of the stem in FIG. 3.

The vacuum-hydraulic signal controlled transducer valve shown in FIG. 13 operates on the vacuum suspended principle and is provided by modifying the arrangement shown in FIG. 4 as follows: The air opening 152 in the stem head 38 in FIG. 4 is omitted, and the air opening 154 in the housing shell 14 in FIG. 4 is replaced by a tapped opening supporting the hose coupling 370. The solid stem 36 of FIG. 4 is replaced by a hollow stem, thus providing a bore 372 which communicates the air chamber 94 with the atmosphere. The hollow stem is provided at its outer end with an enlarged piston 374, the end bore 74 of the end section 26 being enlarged to accommodate it. A cup seal 376 forms a seal between the piston and bore, and is confined between spaced washers 378 which abut the shoulder 380 and snap ring 382 in the end section. The spring 70 of FIG. 4 is replaced by a conical compression spring 384, preferably interposed between the piston 374 and the snap ring 386 which replaces the shoulder 78 of FIG. 4 for confining the cup seal 76.

By the foregoing arrangement, there is provided in the transducer valve a controlled vacuum chamber 88 formed between the sealing ring 32 and the cup seal 150, a vacuum source chamber 20 between the cup seal 150 and the diaphragm 16, an air chamber 94 between the secondary valve seal 46 and the atmosphere through the stem bore 372, a vacuum signal chamber 18 as in FIG. 4, and a hydraulic fluid pressure balancing chamber 388 formed between the cup seals 76 and 376. This latter chamber communicates with a tapped opening 390 in the end section 26, the opening supporting a conduit coupling 392 for connection to a source of variable hydraulic signal pressure.

Referring now to FIG. 14 of the drawings, the hydraulic multiplier transducer valve shown therein is substantially identical to the valve assembly shown in FIG. 5, with the exceptions that the stepped piston 162, 164 is reversed end for end, with appropriate modifications of the confining bores and cup seals, and the spring 70 in FIG. 5 is replaced by spring 400, conveniently positioned to encircle the smaller piston section 164 and to abut at its opposite ends against the spacer 174 and the larger piston section 162, respectively.

The vacuum signal controlled transducer valve shown in FIG. 15 is substantially identical to the transducer valve shown in FIG. 6 with the exception that the spring 276 in FIG. 6 is eliminated and a spring 410 is arranged in the controlled vacuum chamber 206 to abut at its opposite ends against the plate 248 and the diaphragm backing plate 214. By this arrangement the diaphragm 204 and the attached stem assembly is urged toward the right, thereby normally maintaining the vacuum valve seats 264 and 268 separated from their respective check seals. Accordingly, spring 274 urges the valve pin 244 toward the right, thereby normally maintaining the air valve seats 254 and 258 closed against their respective check seals.

The spring signal controlled transducer valve shown in FIG. 16 is provided by modifying the valve assembly shown in FIG. 15, as follows: The reduced hollow end of the end closure 226 is extended slightly and receives therein the enlarged shoulder 420 provided intermediate the ends of the actuating rod 422. The inner end of the actuating rod is received freely within a guide bore 424 provided in the outer portion of the stem 222, and this inner portion of the actuating rod is encircled by a compression spring 426 which abuts at its opposite ends against the outer end of the stem 222 and the shoulder 420, respectively. Outward extension of the actuating rod is limited by abutment of the shoulder 420 with the snap ring 428. The limit of inward movement of the actuating rod, and hence the degree of compression of the spring 426, may be controlled by the provision of the adjustment nut 430 on the outer threaded portions of the actuating rod. In the embodiment illustrated, the outer end of the actuating rod is provided with an enlarged head 432 which functions as an abutment for the actuating roller 358, described hereinbefore in connection with FIG. 11.

The stem 222 is closed inwardly of the cup seal 228, and the forward hollow portion thereof communicates with the vacuum supply chamber 210 by means of one or more openings 434.

The electric signal controlled transducer valve shown in FIG. 17 is provided by modifying the right hand end of the assembly shown in FIG. 15 in substantially the identical manner in which FIG. 6 is modified in FIG. 8. In this instance, however, the soft iron section 440 carried by the stem 222, is so arranged with respect to the coil 310 that energization of the latter induces movement of the stem toward the left. In addition, the stem 222 is closed inwardly of the cup seal 228, in the manner illustrated in FIG. 16.

The hydraulic signal controlled transducer valve shown in FIG. 18 is provided by modifying the right hand end of the valve shown in FIG. 15, as follows: The end closure 226 of FIG. 15 is replaced by the hollow end section 450, the inner end of which projects into the vacuum supply chamber 210 and into a recess provided in the dampener weight 238, as in FIG. 9. The stem 222 is closed inwardly of the cup seal 228, and the hollow inward portion thereof communicates with the vacuum supply chamber through one or more openings 452. The outer solid end of the stem projects through the cup seal 228 and communicates with a tapped opening 454 in the end section 450. The opening receives the hydraulic conduit 456 for connection to a source of hydraulic fluid signal pressure.

TRANSDUCER VALVE OPERATION

Air Suspended Principle

In the operation of the transducer valve of FIG. 1, the hose coupling 34 is connected to a source of vacuum, the hose coupling 92 is connected to a device which is to be supplied with a variable controlled vacuum at high volume, and the hose coupling 22 is connected to a small capacity vacuum signal source, the magnitude of which is capable of being controlled.

In the normal rest condition of the valve illustrated in FIG. 1, the spring 70 has urged the diaphragm 16 and the attached stem assembly toward the right, with the stem extension 42 abutting the secondary vacuum valve seat 60 and holding the latter closed against its check seal 66. The lighter spring 68 also has urged the valve pin 54 toward the right, maintaining the pilot vacuum valve seat 58 closed against its check seal 64. Thus, the vacuum source at coupling 34 is sealed from the controlled vacuum chamber 88 by the closed vacuum valve seats. The air valve seats 48 and 56, being separated from their respective check seals 46 and 50, thus communicate the controlled vacuum chambers 20, 88 to the atmosphere through the space between the abutting seat 60 and head extension 42, thence through the hollow stem 36 and opening 82.

As a small capacity vacuum signal is introduced to the diaphragm chamber 18, a differential fluid pressure is developed across the diaphragm, and the higher pressure of the atmosphere in chamber 20 exerts a force on that side of the diaphragm to move the latter and the attached stem assembly toward the left, against the compression of spring 70. This leftward movement first occurs without movement of the stem 54, by extension of spring 68, and without movement of seat 60 because of the opposing force of vacuum supplied to it from 34. Accordingly, this leftward movement results first in the closing of the air valve check seals 46 and 50 against their respective seats 48 and 56, in that order. Further leftward movement then causes stem 54 to be moved leftward with it, resulting in separation of the pilot vacuum valve seat 58 from its check seal 64. Seat 58 separates from seal 64 because the force applied by diaphragm 16 is greater than the opposing force of vacuum reacting against the area of seat 64 defined by the seal 64. Seat 58 separates before secondary seat 60 because its smaller vacuum reaction area provides less opposition. The seat 64 is held stationary with the secondary valve seat 60 by the vacuum supplied at coupling 34. However, substantial movement of the diaphragm toward the left, proportional to the magnitude of the small capacity vacuum signal applied to chamber 18, will cause the pilot vacuum valve seat 58 to engage the snap ring 62 and pull the secondary vacuum valve seat 60 away from its check seal 66, to provide for more rapid evacuation of the controlled vacuum chamber 20, 88.

Since the pilot valve seat 58 unseats in response to a smaller vacuum signal at 22 than does secondary seat 60, it will be apparent that smoother and more precise control over a wider range is afforded by the double valve arrangement.

When the magnitude of the large volume vacuum pressure in the controlled vacuum chamber 20, 88 balances the magnitude of the small capacity vacuum signal in chamber 18, there is no differential pressure across the diaphragm 16 and hence the valve assembly is in a state of equilibrium. In this condition, the spring 70 urges the diaphragm and stem assembly toward the right, closing the vacuum valve seats 60, 58, in that order, against their respective check seals 66, 64 while maintaining the air valve seats 48, 56 closed against their respective check seals 46, 50. In this manner, the magnitude of the large volume vacuum at the output hose coupling 92 is established by a proportional magnitude of low capacity vacuum signal supplied to the hose coupling 22.

Further increase in the low capacity vacuum signal supplied to chamber 18 results in a repetition of the foregoing procedure to increase the magnitude of the large volume vacuum output to hose coupling 92, as will be apparent.

When the low capacity vacuum signal to chamber 18 is decreased, i.e. elevated toward atmospheric pressure, a differential pressure across the diaphragm 16 is developed, with the greater pressure being in chamber 18. Accordingly, the diaphragm and the stem assembly is forced toward the right until the pilot air valve seat 56 is separated from its check seal 50 and, if necessary, the secondary air valve seat 48 is separated from its seal 46, thereby admitting air through the hollow stem 36 into the controlled vacuum chambers 20, 88. When the elevated pressure in the controlled vacuum chambers 20, 88 balances the pressure in chamber 18, the state of equilibrium again is attained with the air valve seats and vacuum valve seats closed against their respective seals to maintain the adjusted vacuum pressure at the output coupling 92.

The operation of the transducer valve shown in FIG. 2 is identical to that of FIG. 1, with the exception that the controlling signal is supplied by the tensioning of spring 108 rather than by the introduction of a small capacity vacuum signal. Accordingly, it will be understood that when the transducer valve of FIG. 2 is employed, the hose coupling 22 simply is opened to the atmosphere to maintain atmospheric pressure in chamber 18. Whereas in FIG. 1 maximum high volume vacuum output at coupling 92 may be regulated by the magnitude of the small capacity vacuum signal applied at hose coupling 22, the maximum vacuum output of the valve shown in FIG. 2 is regulated by adjustment of the nut 102 to limit the outward extension of the sleeve 104 and hence the maximum tension on the spring 108.

The operation of the electric signal controlled transducer valve of FIG. 3 also is identical to the operation of a valve of FIG. 1, with the exception that the differential pressure across the diaphragm 16 is created by the leftward pull on the stem 36 by the solenoid coil 122. The magnitude of such pull is determined by the position of the contact 134 along the resistance 132, the maximum magnitude of which may be controlled by adjustment of the cap 140 in relation to the abutment shoulder 142 on the plunger 138, or by the position of the adjustment nut 146 on the plunger, depending upon the direction of movement on the plunger for increasing the voltage to the coil. As in FIG. 2, the hose coupling 22 and the chamber 18 communicating therewith, are open to the atmosphere.

The transducer valve shown in FIG. 4 is designed to control the operation of a hydraulic fluid pressure pump which is powered by the development of a differential pressure across a movable diaphragm or piston. Illustrative of such a hydraulic pump is the type presently employed in so-called power brakes for vehicles, wherein a movable diaphragm is connected to the piston of a hydraulic pump and a differential pressure is developed across the diaphragm by opening one side of the diaphragm to the atmosphere and applying a controlled variable large volume vacuum to the opposite side of the diaphragm. In this manner the diaphragm is forced to move, thereby driving the pump piston which, in turn, applies increased hydraulic fluid pressure to the wheel cylinders of the vehicle brake system.

Thus, in the operation of the transducer valve of FIG. 4, the hydraulic fluid pressure output from a hydraulic pump 74' not only is connected to the wheel brake cylinders of a vehicle or other device to be operated, but also to the port 74 of the transducer valve. The vacuum source coupling 34 is connected to a source of vacuum, for example the intake manifold of a vehicle engine, and the controlled large vacuum output coupling 92 is connected to the controlled vacuum chamber of the diaphragm section of the hydraulic pump. A small capacity variable vacuum signal is connected to the coupling 22 of the transducer valve for impressing the controlled signal on the side of the diaphragm 16 facing chamber 18. The opposing chamber 20 is exposed to the atmosphere through the openings 154.

The operation of the transducer valve of FIG. 4 differs from that of FIG. 1, as follows: Whereas in FIG. 1 the controlled vacuum chamber 88 communicates directly with the diaphragm chamber 20, these chambers are isolated from each other in FIG. 4, by the cup seal 150. Thus, whereas in FIG. 1 it is the controlled large volume vacuum in the chambers 20, 88 that functions to balance the low capacity signal vacuum in chamber 18, in FIG. 4 it is the hydraulic fluid pressure applied from the source 74' to the solid end of the stem 36 in the bore 74 that is employed to balance the low capacity vacuum signal in chamber 18.

The transducer valve shown in FIG. 5 is designed to provide hydraulic pressure multiplication, and is especially suited for use in vacuum operated power assist braking system for vehicles. Such systems employ a vacuum operated hydraulic pump of the type described hereinbefore in connection with FIG. 4, wherein the hydraulic pump section also includes a hydraulic fluid inlet which is connected to the conventional master cylinder pump operated by a brake pedal.

Thus, in the operation of the transducer valve of FIG. 5, the vacuum source coupling 34 is connected to a source of vacuum, and the higher volume controlled vacuum output conduit 92 is connected to the controlled vacuum chamber of the diaphragm section 92' of the hydraulic pump 92". The lower pressure hydraulic fluid coupling 188 is coupled into the conduit which interconnects the master cylinder pump 188' and the inlet to the vacuum powered hydraulic pump 92", and the high pressure hydraulic coupling 190 is connected to the outlet of the vacuum powered pump. As hydraulic fluid pressure is supplied to the vehicle wheel cylinders, by manipulation of the brake pedal, that fluid pressure also is supplied through coupling 188 to the fluid pressure chamber 184 of the transducer valve, where it is impressed against the end of the larger section 162 of the piston. Thus, the piston and attached stem assembly is caused to be moved toward the left, thereby closing the air valve seats 48 and 56 against their respective check seals and separating the pilot vacuum valve seat 58 from its check seal and, if necessary, the secondary vacuum valve seat 60 from its check seal. The controlled vacuum chamber 88 thus is opened to the vacuum supply at coupling 34, to develop a controlled large volume vacuum at the output coupling 92 and hence at the controlled vacuum chamber of the diaphragm section of the hydraulic pump. The pump piston thus is caused to be moved with the pump diaphragm, to increase the hydraulic fluid pressure to the wheel cylinders, as explained hereinbefore. This increased hydraulic fluid pressure also is supplied through the coupling 190 to the end of the smaller piston section 164 in the higher pressure hydraulic fluid chamber 166. When the forces acting against the opposing ends of the stepped piston are balanced, the transducer valve is in a state of equilibrium, and the spring 70 moves the stem assembly toward the right to close the vacuum valve seats and thus prevent further evacuation of the controlled chamber 88.

Thus, it will be seen that the transducer valve of FIG. 5 functions to control the large volume vacuum output to coupling 92 by the balancing of forces exerted on opposite ends of the stepped piston 162, 164 by hydraulic pressures of different magnitudes. The magnitudes of hydraulic pressure creating such balance are determined by the relative areas of the opposite ends of the stepped pistons, and these areas may be varied over a substantial range for any purpose desired. In the case of a power assist braking system for vehicles, these areas are selected to provide a multiplication of approximately three times, i.e. to provide an output hydraulic fluid pressure from the vacuum powered hydraulic pump to the wheel cylinders, of about three times the hydraulic fluid pressure from the master cylinder pump.

The operation of the transducer valve shown in FIG. 6 is substantially the same as that of the transducer valve shown in FIG. 1. A source of vacuum is connected to the coupling 236, a source of variable low capacity vacuum signal is connected to the coupling 210 and the controlled high volume vacuum output in chamber 206 is connected through coupling 212 to a variable vacuum powered device to be controlled. As the low capacity vacuum signal is applied to the side of the diaphragm 204 facing the signal chamber 208, the higher pressure of the atmosphere in chamber 206 forces the diaphragm and attached stem assembly toward the right, first closing the air valve seats 254 and 258 against their respective check seals and then opening the pilot vacuum 268 and, if necessary, the secondary vacuum valve seat 264. Vacuum from the supply coupling 236 thus is admitted through the hollow stem 222 into the chamber 206, and when this reduced pressure balances the low capacity vacuum signal in chamber 208, the spring 276 urges the diaphragm and stem assembly toward the left to close the vacuum valve seats.

The operation of the spring signal controlled transducer valve of FIG. 7 is substantially identical to that of the vacuum signal controlled transducer valve of FIG. 6 with the exception that the tensioning of spring 308 upon outward movement of the actuating rod 300, provides the signal which is supplied by the low capacity vacuum signal in FIG. 6. Maximum signal may be controlled by the adjustment nut 302, in the manner of the adjustment nut 102 of FIG. 2, described hereinbefore.

In FIG. 8, the controlled signal pressure is provided by selective energization of the coil 310 to induce proportional movement of the diaphragm and the stem assembly toward the right. Although this direction of movement is opposed to the direction of movement of the stem in FIG. 3, the mode of operation is the same.

The mode of operation of the transducer valve shown in FIG. 9 is similar to that of FIG. 5, with the exception that the hydraulic fluid pressure signal applied through coupling 338 to the piston 322, is balanced by the resulting high volume controlled vacuum developed in chamber 206, rather than by a higher magnitude hydraulic fluid pressure, as in FIG. 5. Whereas in FIG. 5 the ratio of hydraulic fluid pressures is determined by the relative areas of the opposing ends of the stepped piston, in FIG. 9 the ratio of hydraulic fluid pressure signal input to the high volume vacuum output is controlled by the relative areas of the piston 322 and the diaphragm 204.

TRANSDUCER VALVE OPERATION

Vacuum Suspended Principle

Referring now to FIG. 10 of the drawings, the operation of the transducer valve shown therein is similar to the operation of the valve shown in FIG. 1, the primary distinction being that the chambers 20, 88 in FIG. 10 initially are evacuated to the sub-atmospheric pressure of the vacuum supply source, whereas in FIG. 1 these chambers are at atmospheric pressure. This difference is derived by the particular arrangements of the springs 350 and 70, in FIGS. 10 and 1 respectively, as explained hereinbefore. The coupling 22 leading to the diaphragm chamber 18 is connected to a source of variable low capacity vacuum signal, as in FIG. 1. However, whereas in FIG. 1 the chambers 18 and 20 initially are at atmospheric pressure and the magnitude of the signal increases as the vacuum increases, in FIG. 10 the chambers 18 and 20 initially are at maximum vacuum and the magnitude of the low capacity signal at the coupling 22 increases as the signal pressure increases toward atmospheric. Thus the initial arrangement of the valve assembly in FIG. 1 results from a condition of air suspension, whereas in FIG. 10 the initial condition of the valve assembly results from a condition of vacuum suspension.

As the small capacity vacuum signal supplied to chamber 18 through coupling 22 increases in pressure toward atmospheric, the differential pressure across the diaphragm 16 forces the latter toward the right, first closing the vacuum air valve seats 60, 58 in that order and then opening the air valve seats 56, 48 in that order. Atmospheric air thus is introduced from the hollow stem 36, into the air chamber 94 and thence into the diaphragm chamber 20. When this elevated pressure in the chamber 20 equals the pressure in chamber 18, the condition of equilibrium is attained and the spring 350 operates to close the air valve seats.

The operation of the spring signal controlled transducer valve of FIG. 11 and the electric signal controlled transducer valve of FIG. 12 are substantially identical to that of FIG. 10, with the exception that the signal pressure is provided by the compression of a spring and by the force of the solenoid coil, respectively, in manner analogous to the operation of the valves shown in FIGS. 2 and 3.

The operation of the vacuum-hydraulic signal controlled transducer valve of FIG. 13 is similar to that of FIG. 4, the primary difference being the initial condition of suspension as explained hereinbefore in connection with FIGS. 1 and 10. In FIG. 13, however, the chambers 20 and 88 are isolated from each other by the cup seal 150, and the chamber 20 is connected through the coupling 370 to a source of vacuum, for example the same source connected to the coupling 34. Thus, whereas in FIG. 4 the chamber 20 is connected to the atmosphere as a reference fluid pressure, in FIG. 13 the chamber 20 is connected to a source of vacuum as a reference fluid pressure.

As in FIG. 10 the coupling 22 is connected to a source of variable low capacity vacuum signal, the magnitude of which increases toward atmospheric pressure. Thus, when the transducer valve of FIG. 13 is employed to control the operation of a vacuum powered hydraulic pump of the type described hereinbefore in connection with FIG. 4, the reference chamber of the diaphragm section of the pump is connected to a source of vacuum as a reference fluid pressure, rather than to the atmosphere as described hereinbefore, and the controlled high volume vacuum output 92 is connected to the controlled vacuum chamber of the diaphragm section of the pump.

Thus, as the transducer valve of FIG. 13 operates under the influence of a low capacity vacuum signal at chamber 18, to elevate the vacuum pressure in the controlled chamber 88 toward atmospheric, the vacuum operated pump is driven to supply increased hydraulic fluid pressure from pump 74' through conduit 392 to the valve chamber 388, where the hydraulic fluid pressure is impressed upon the piston 374. When the force exerted by the hydraulic fluid pressure against the piston 374 balances the opposing force of the signal pressure in chamber 18, the transducer valve attains a state of equilibrium and the spring 384 operates to close the air valve seats and and thus maintain the established pressure in the control chamber 88.

The operation of the transducer valve shown in FIG. 14 is substantially identical to that of FIG. 5, with the exception that the higher magnitude hydraulic fluid pressure from the pump 92" is connected to coupling 188 and the lower magnitude hydraulic fluid pressure from master cylinder pump 188' is connected to the coupling 190, for reasons wihch will be apparent.

The operation of the transducer valves shown in FIGS. 15, 16, 17 and 18 differ from the operations of the corresponding valves shown in FIGS. 6, 7, 8 and 9 in the same manner as the operation of the valves of FIGS. 10, 11, 12 and 14 differ from the operation of the corresponding valves shown in FIGS. 1, 2, 3, and 5, described hereinbefore.

It is to be noted that the stepped piston 162, 164 in FIGS. 5 and 14 performs the function of the diaphragm 16 in the other valves illustrated. Accordingly, the recitation in the appended claims of diaphragm means is intended to include the stepped piston and its associated seals.

A particularly advantageous feature of the transducer valve constructions described herein resides in the provision of the pilot and secondary valve seats for air and vacuum, respectively. The smaller pilot valve seats respond to extremely small differential pressure signals, while the larger secondary valve seats require larger signals for response. It is by this arrangement that the transducer valve output tracks the input signal instantly and precisely, with minimum hysteresis. It is this quality of operation that renders the valves particularly suitable for use in vehicle brake systems, since they provide proper braking response and "feel" to the action of the driver's foot.

Another advantageous feature of the transducer valve constructions described herein resides in the provision of the relatively massive stem head extensions 42 and dampener weights 238, which function to retard the movement of the diaphragm means and thus eliminate vibration and flutter which is inherent in conventional valve systems, principally air or vacuum systems and, to a lesser degree, in hydraulic systems.

A further important feature of the transducer valve constructions described herein resides in the fact that a majority of the component parts of each of the valve assemblies illustrated, are interchangeable. In most instances the only change required to convert a valve from one mode of operation to another is the substitution of one end section of the valve. Thus, a substantial variety of valves may be assembled from a minimum number of standard components to afford various modes of operation, thereby simplifying the assembly and reducing the cost of manufacture to a practicable minimum.

It will be apparent to those skilled in the arts that various changes in the details of construction and arrangement of parts described hereinbefore may be made without departing from the spirit of this invention and the scope of the appended claims.

Having now described our invention and the manner in which the same may be used, what we claim as new and desire to secure by Letters Patent is:

1. A transducer valve comprising a hollow body defining an air chamber, a controlled fluid pressure chamber, a fluid pressure supply chamber, first valve means releasably sealing the air chamber and controlled fluid pressure chamber from each other, second valve means releasably sealing the controlled fluid pressure chamber and fluid pressure supply chamber from each other, movable diaphragm means operatively engaging the first and second valve means for moving the latter, resilient means operatively engaging the diaphragm means and normally urging one of the valve means to sealing position and the other valve means to unsealing position, the first and second valve means each comprising a pilot valve member and a secondary valve member of larger sealing area, the pilot and secondary valve members being movable relative to each other and arranged in such manner that the pilot valve member unseals before the secondary valve member and the secondary valve member seals before the pilot valve member, means operatively associated with the diaphragm means for applying to the latter a variable signal force for urging the diaphragm means in the direction opposing the resilient means, whereby to change the magnitude of fluid pressure in the controlled fluid pressure chamber, and means operatively associated with the diaphragm means for applying to the latter in the direction opposing the variable signal force a balancing fluid pressure force corresponding to the attained magnitude of fluid pressure in the controlled fluid pressure chamber.

2. The transducer valve of claim 1 wherein the variable signal force is a variable fluid pressure signal.

3. The transducer valve of claim 1 wherein the variable signal force is a variable vacuum signal.

4. The transducer valve of claim 1 wherein the variable signal force is a variable hydraulic fluid pressure signal.

5. The transducer valve of claim 1 wherein the variable signal force is a variable spring pressure signal.

6. The transducer valve of claim 1 wherein the variable signal force is a variable electric solenoid force signal.

7. The transducer valve of claim 1 wherein the balancing fluid pressure is a fluid pressure corresponding to and developed by the attained fluid pressure in the controlled fluid pressure chamber.

8. The transducer valve of claim 1 including a source of hydraulic fluid pressure and wherein the balancing fluid pressure is a hydraulic fluid pressure corresponding to and developed by the attained fluid pressure in the controlled fluid pressure chamber.

9. The transducer valve of claim 1 wherein the balancing fluid pressure is the attained fluid pressure in the controlled fluid pressure chamber.

10. The transducer valve of claim 1 including dampener weight means associated with the diaphragm means for retarding movement of the diaphragm means and reducing vibration and flutter of the valve means during operation of the transducer valve.

11. The transducer valve of claim 1 wherein the resilient means is arranged to normally urge the first valve means to sealing position and the second valve means to unsealing position.

12. The transducer valve of claim 1 wherein the resilient means is arranged to normally urge the second valve means to sealing position and the first valve means to unsealing position.

13. The transducer valve of claim 1 wherein the means for applying a variable signal force comprises a housing for the diaphragm means and defining with the latter a fluid pressure signal chamber, the signal chamber being adapted for communication with a source of variable signal fluid pressure.

14. The transducer valve of claim 1 wherein the means for applying a variable signal force comprises a housing for the diaphragm means and defining with the latter a fluid pressure signal chamber on one side of the diaphragm means and a second fluid pressure chamber on the opposite side of the diaphragm means, the signal chamber being adapted for communication with a source of variable signal fluid pressure, the second fluid pressure chamber communicating with the controlled fluid pressure chamber.

15. The transducer valve of claim 1 wherein the means for applying a variable signal force comprises a housing for the diaphragm means and defining with the latter a fluid pressure signal chamber on one side of the diaphragm means and a second fluid pressure chamber on the opposite side of the diaphragm means, the signal chamber being adapted for communication with a source of variable signal fluid pressure, the second fluid pressure chamber being adapted for communication with a source of variable fluid pressure the magnitude of which is varied by and in proportion to the magnitude of the fluid pressure in the controlled fluid pressure chamber.

16. The transducer valve of claim 1 wherein the means for applying a variable signal force comprises a housing for the diaphragm means and defining with the latter a fluid pressure signal chamber on one side of the diaphragm means and a constant reference fluid pressure chamber on the opposite side of the diaphragm means, the signal chamber being adapted for communication with a source of variable signal fluid pressure.

17. The transducer valve of claim 1 wherein the means for applying a variable signal force comprises a housing for the diaphragm means and defining with the latter a fluid pressure signal chamber on one side of the diaphragm means and the controlled fluid pressure chamber on the opposite side of the diaphragm means, the signal chamber being adapted for communication with a source of variable signal fluid pressure.

18. The transducer valve of claim 1 wherein the means for applying a variable signal force comprises a housing for the diaphragm means and defining with the latter a fluid pressure signal chamber, the signal chamber being adapted for communication with a source of variable signal fluid pressure, and piston means engaging the diaphragm means, the body having a bore therein receiving the piston for movement by hydraulic pressure and adapted for communication with a source of variable hydraulic fluid pressure the magnitude of which is varied by and in proportion to the magnitude of the fluid pressure in the controlled fluid pressure chamber.

19. The transducer valve of claim 1 wherein the diaphragm means comprises a piston having opposite ends of different diameters, the variable signal force being applied to one end and the balancing force being applied to the other end.

20. A transducer valve comprising a hollow body defining an air chamber, a controlled fluid pressure chamber, a fluid pressure supply chamber, first valve means releasably sealing the air chamber and controlled fluid pressure chamber from each other, second valve means releasably sealing the controlled fluid pressure chamber and fluid pressure supply chamber from each other, movable diaphragm means operatively engaging the first and second valve means for moving the latter, resilient means operatively engaging the diaphragm means and normally urging one of the valve means to sealing position and the other valve means to unsealing position, a housing for the diaphragm means and defining with the latter a fluid pressure signal chamber on one side of the diaphragm means and a second fluid pressure chamber on the opposite side of the diaphragm means, the signal chamber being adapted for communication with a source of variable signal fluid pressure, and the second fluid pressure chamber communicating with the controlled fluid pressure chamber for applying to the diaphragm means in the direction opposing the variable signal force the balancing fluid pressure in the controlled fluid pressure chamber.

21. A transducer valve comprising a hollow body defining an air chamber, a controlled fluid pressure chamber, a fluid pressure supply chamber, first valve means releasably sealing the air chamber and controlled fluid pressure chamber from each other, second valve means releasably sealing the controlled fluid pressure chamber and fluid pressure supply chamber from each other, movable diaphragm means operatively engaging the first and second valve means for moving the latter, resilient means operatively engaging the diaphragm means and normally urging one of the valve means to sealing position and the other valve means to unsealing position, a housing for the diaphragm means and valve means to unsealing position, a housing for the diaphragm means and defining with the latter a fluid pressure signal chamber on one side of the diaphragm means and a second fluid pressure chamber on the opposite side of the diaphragm means, the signal chamber being adapted for communication with a source of variable signal fluid pressure, and the second fluid pressure chamber being adapted for communication with a source of variable fluid pressure the magnitude of which is varied by and in proportion to the magnitude of fluid pressure in the controlled fluid pressure chamber for applying to the diaphragm means in the direction opposing the variable signal force a balancing fluid pressure force corresponding to the attained magnitude of fluid pressure in the controlled fluid pressure chamber.

22. A transducer valve comprising a hollow body defining an air chamber, a controlled fluid pressure chamber, a fluid pressure supply chamber, first valve means releasably sealing the air chamber and controlled fluid pressure chamber from each other, second valve means releasably sealing the controlled fluid pressure chamber and means operatively engaging the first and second valve means for moving the latter, resilient means operatively engaging the diaphragm means and normally urging one of the valve means to sealing position and the valve means to unsealing position, a housing for the diaphragm means and defining with the latter a fluid pressure signal chamber on one side of the diaphragm means and the controlled fluid pressure chamber on the opposite side of the diaphragm means, the signal chamber being adapted for communication with a source of variable signal fluid pressure.

23. A transducer valve comprising a hollow body defining an air chamber, a controlled fluid pressure chamber, a fluid pressure supply chamber, first valve means releasably sealing the air chamber and controlled fluid pressure chamber from each other, second valve means releasably sealing the controlled fluid pressure chamber and fluid pressure supply chamber from each other, a piston operatively engaging the first and second valve means for moving the latter, resilient means operatively engaging the diaphragm means and normally urging one of the valve means to sealing position and the other valve means to unsealing position, the piston having opposite ends of different diameters, means operatively associated with the piston for applying to one end of the latter of variable hydraulic signal force for urging it in the direction opposing the resilient means, whereby to change the magnitude of fluid pressure in the controlled fluid pressure chamber, and means operatively associated with the other end of the piston for applying to the latter in the direction opposing the variable hydraulic signal force a balancing hydraulic signal force the magnitude of which is varied by and in proportion to the magnitude of the fluid pressure in the controlled fluid pressure chamber.

References Cited in the file of this patent

UNITED STATES PATENTS

| | | |
|---|---|---|
| 2,411,748 | Kelley | Nov. 26, 1946 |
| 2,493,449 | Fitch | Jan. 3, 1950 |
| 2,496,904 | Bent | Feb. 7, 1950 |
| 2,910,325 | Price et al. | Oct. 27, 1959 |

UNITED STATES PATENT OFFICE
CERTIFICATE OF CORRECTION

Patent No. 3,073,344 January 15, 1963

Merle M. Sheriff et al.

It is hereby certified that error appears in the above numbered patent requiring correction and that the said Letters Patent should read as corrected below.

Column 18, lines 12 and 13, strike out "a housing for the diaphragm means and valve means to unsealing position,"; line 34, after "and", first occurrence, insert -- fluid pressure supply chamber from each other, movable diaphragm --; line 37, before "valve", second occurrence, insert -- other --; same column, line 54, for "diaphragm means" read -- piston --.

Signed and sealed this 3rd day of September 1963.

(SEAL)
Attest:

ERNEST W. SWIDER
Attesting Officer

DAVID L. LADD
Commissioner of Patents